Feb. 18, 1936.   R. H. CANFIELD   2,030,855
MEANS FOR TESTING MATERIALS
Filed March 8, 1934
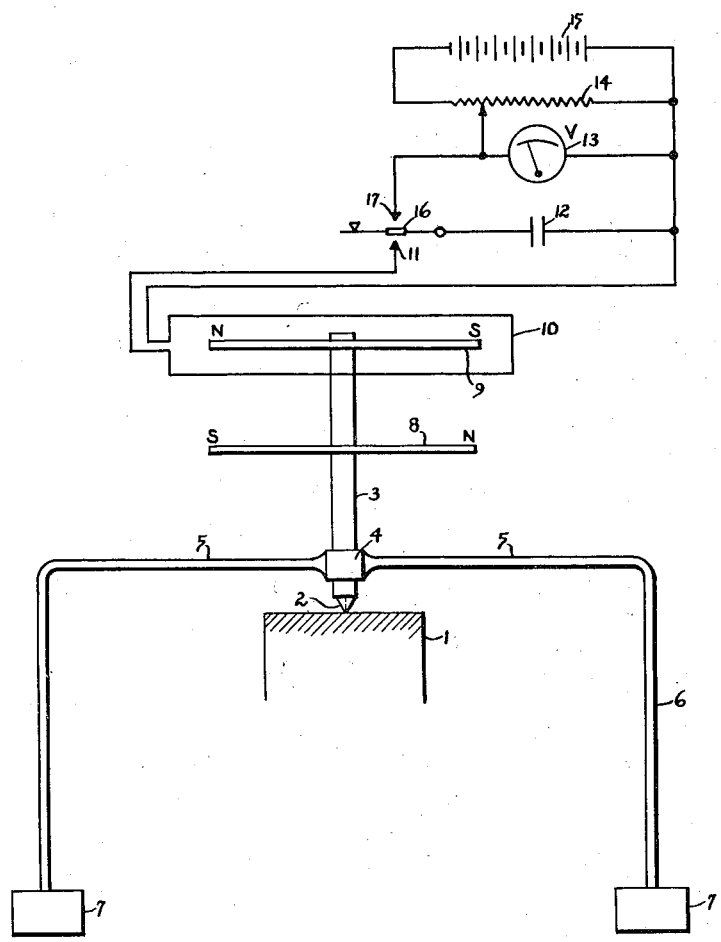
INVENTOR
*Robert H. Canfield*
BY
*Harold Dodd*.
ATTORNEY Patented Feb. 18, 1936

2,030,855

UNITED STATES PATENT OFFICE 2,030,855

MEANS FOR TESTING MATERIALS

Robert H. Canfield, Washington, D. C.

Application March 8, 1934, Serial No. 714,654

8 Claims. (Cl. 265—12)

(Granted under the act of March 3, 1883, as amended April 30, 1928; 370 O. G. 757)

This invention relates to testing certain physical properties of materials and particularly those properties that are, at least in part, dependent upon the hardness thereof.

It is the object of this invention to provide means for performing the above mentioned tests by utilizing an actuating force applied by a device having no mechanical bearings with the resulting uncertainty of results due to the effects of friction therein.

The drawing shows diagrammatically one form of apparatus that is well adapted for practicing my invention.

Most devices now in use for measuring hardness do so by impressing some sort of tool, such as a steel ball or a diamond cone into the surface of the material to be tested and afterwards employ a measurement of the depth or diameter of the depression so produced as an index of the hardness, the greater the impression so produced the less the hardness of the material. The indentations made by such instruments are usually of the order of one to five one-hundredths of an inch in depth and are hence not adapted to measure the hardness of thin platings or of case-hardened layers where the material to be tested may be less than a thousandth of an inch thick.

My device differs from the foregoing and involves determining the resistance to both indentation and abrasion simultaneously; while at the same time it affects a thickness of material which may be less than a ten-thousandth of an inch.

In the drawing, the material to be tested is indicated by the numeral 1. The point 2 of the testing device is preferably in the form of a corner of a cube, that is, a three sided pyramid wherein the apical angle of each face is a right angle, but it may have other surface configurations adapted to shear or gouge the material, or it may be a cone for some purposes, and is preferably made of diamond; however, any material of suitable hardness may be used instead. The point 2 is mounted at one end of a stem 3 to which is rigidly secured a light frame 4 which includes oppositely disposed, laterally extending arms 5 with down-turned portions 6, there being a suitable mass 7 secured to the lower end of each down-turned portion 6.

Fixed to the stem 3 are bar magnets 8 and 9, which are disposed parallel with each other and are of substantially equal pole strengths, the opposite poles being adjacent each other to form an astatic system. Supported in any suitable manner and disposed around one of the magnets in a manner not to interfere with the free rotation thereof is a coil 10 connected at one terminal to a switch contact point 11 and at the other terminal to condenser 12, voltmeter 13 and variable resistance 14, all of which are in parallel. Battery 15 is connected across the terminals of resistance 14.

The mode of operation is as follows: It will be noted that the center of gravity of the assembly consisting of masses 7, frame 4, stem 3, and magnets 8 and 9 is below the contact of point 2 with material 1 and therefore, since the masses 7 balance, the aforesaid assembly is in stable equilibrium and will remain at rest with the stem 3 extending upwardly, any tendency to tipping being counteracted by the masses 7 which balance each other and, due to the position of the masses, any motion of stem 3 at an angle to the arms 5 involves raising the masses 7. Thus it requires no mechanical supports with bearings in which friction would develop.

Due to the fact that resistance 14 is adjusted to a given value and that condenser 12 is connected across the terminals of the resistance, when switch 16 is moved up against contact 17 a definite charge of electricity, depending upon the voltage of battery 15, the value given to resistance 14 and the capacity of condenser 12, will be placed upon the condenser. Voltmeter 13 is provided to indicate when the adjustments are right to impress upon the condenser 12 the charge of the proper value. When switch 16 is thereafter depressed to contact the point 11, the condenser will be discharged through coil 10 and by the magnetic field set up as a result of the current passing through coil 10 the magnet 9 will be acted upon by a rotative couple of definite magnitude. This couple will cause rotation of stem 3 and point 2, which will result in the cutting edges of point 2 shearing away a quantity of material 1 that will depend upon the hardness of such material.

I have found, for example, with a frame weighing 42.4 grams and having a moment of inertia of 686 gm.-cm$^2$, given an initial momentum of 77 gm.-cm. per second, that the frame rotates 245 degrees on polished quartz, 185 degrees on pyrex glass, 140 degrees on hard steel, 60 degrees on chromium plate, 27 degrees on sealing wax, and 15 degrees on lead. These readings repeat within 5 per cent.

Further, I have found that one diamond point differs from another but that by changing the weight and moment of inertia of the frame, or the voltage or capacity of the supply of current to the coil, duplicate readings may be obtained.

Although the coefficient of friction of the specimen against the diamond point does enter into the resultant reading, nevertheless the size of the impression is of overshadowing importance, the moment of the frictional forces varying with the cube of the diameter of the impression. Thus this instrument does yield readings in very close agreement with the classical definition of hardness, namely, "resistance to indentation or abrasion."

The invention described herein may be manufactured and used by or for the Government of the United States of America for governmental purposes without the payment of any royalties thereon or therefor.

I claim:

1. In combination, a frame, a stem connected thereto, a plurality of bar magnets carried by said stem to form an astatic system, a point mounted on one end of said stem, said point being in the form of a 3-sided pyramid wherein the apex angle of each face is a right angle, means carried by said frame to act thereon to hold said frame and said stem in stable equilibrium when the assembly consisting of the foregoing elements is supported solely on said point, an electrical circuit having a portion disposed to act on said magnet system to apply a couple to rotate said stem when current flows through said portion, a condenser, means to charge said condenser with a uniform pre-determined charge and means to discharge said condenser through said portion.

2. In combination, a frame, a stem connected thereto, a plurality of bar magnets carried by said stem to form an astatic system, a point mounted on one end of said stem, said point being in the form of a 3-sided pyramid wherein the apex angle of each face is a right angle, means carried by said frame to act thereon to hold said frame and said stem in stable equilibrium when the assembly consisting of the foregoing elements is supported solely on said point, an electrical circuit having a portion disposed to act on said magnet system to apply a couple to rotate said stem when current flows through said portion, means to isolate a pre-determined quantity of electricity, and means to discharge said quantity through said portion.

3. In combination, a frame, a stem connected thereto, a plurality of bar magnets carried by said stem to form an astatic system, a point mounted on one end of said stem, said point being in the form of a 3-sided pyramid wherein the apex angle of each face is a right angle, means carried by said frame to act thereon to hold said frame and said stem in stable equilibrium when the assembly consisting of the foregoing elements is supported solely on said point, and means to apply the magnetic field of an electric current of known quantity of energy to said astatic system to cause said point to rotate.

4. In combination, a frame, a stem connected thereto, a point mounted on one end of said stem, said point being in the form of a 3-sided pyramid wherein the apex angle of each face is a right angle, means carried by said frame to act thereon to hold said frame and said stem in stable equilibrium when the assembly consisting of the foregoing elements is supported solely by said point, and means to apply a known torque to said stem.

5. In combination, a frame, a stem connected thereto, a plurality of bar magnets carried by said stem to form an astatic system, a point mounted on an end of said stem, said point having substantially longitudinally extending cutting edges, means carried by said frame to act thereon to hold said frame and said stem in stable equilibrium when the assembly consisting of the foregoing elements is supported solely on said point, an electric circuit having a portion disposed to act on said magnet system to apply a couple to rotate said stem when current flows through said portion and means to measure a quantity of electricity and pass said quantity through said portion.

6. In combination, a frame, a stem fixed to said frame, a point secured to one end of said stem and having portions to exsect material on which said point bears when rotated, symmetrical balancing masses carried by said frame and disposed to position the center of gravity of the assembly of the foregoing parts below said point, and means non-mechanically connected to said stem to apply rotative effort to the aforesaid parts.

7. In combination a frame, a stem fixed to said frame, a point secured to one end of said stem and having portions to exsect material on which said point bears when rotated around the longitudinal axis of said stem, symmetrical balancing masses carried by said frame and disposed to position the center of gravity of the assembly of the foregoing parts below said point, and means operatively associated with the aforesaid elements to apply rotative effort thereto.

8. In combination, a stem, a point fixed to an end of said stem and having elements to shear away, when rotated, portions of material against which said point bears; means acting by gravitational force only to support said stem in operative position and cause said point to bear on a piece of material, and means to apply to said point a rotative couple of pre-determined magnitude.

ROBERT H. CANFIELD.